United States Patent
Gendou et al.

(10) Patent No.: US 7,690,552 B2
(45) Date of Patent: Apr. 6, 2010

(54) JOINING METHOD AND STRUCTURE OF METAL MEMBERS

(75) Inventors: Toshiyuki Gendou, Hiroshima (JP); Mitsugi Fukahori, Hiroshima (JP); Tetsukan Takasue, Hiroshima (JP); Mitsuaki Kitamura, Hiroshima (JP); Takayuki Kimura, Hiroshima (JP); Masanobu Kobashi, Hiroshima (JP)

(73) Assignee: Mazda Motor Corporation (JP)

( * ) Notice: Subject to any disclaimer, the term of this patent is extended or adjusted under 35 U.S.C. 154(b) by 84 days.

(21) Appl. No.: 11/959,861

(22) Filed: Dec. 19, 2007

(65) Prior Publication Data

US 2008/0173696 A1 Jul. 24, 2008

(30) Foreign Application Priority Data

Dec. 25, 2006 (JP) .............................. 2006-347876

(51) Int. Cl.
*B23K 20/12* (2006.01)
(52) U.S. Cl. ..................................... 228/112.1; 428/544
(58) Field of Classification Search ........................ None
See application file for complete search history.

(56) References Cited

U.S. PATENT DOCUMENTS

| | | | | |
|---|---|---|---|---|
| 6,971,694 B2 * | 12/2005 | Sakuma et al. | .............. | 293/133 |
| 7,503,737 B2 * | 3/2009 | Sherman | ..................... | 410/115 |
| 2002/0069787 A1 * | 6/2002 | Yono et al. | .................. | 105/413 |
| 2005/0035180 A1 | 2/2005 | Nishiguchi et al. | | |
| 2006/0006697 A1 * | 1/2006 | Debuan et al. | ......... | 296/193.01 |
| 2006/0027630 A1 * | 2/2006 | Talwar et al. | ............ | 228/112.1 |
| 2007/0068993 A1 * | 3/2007 | Takase et al. | ............... | 228/101 |
| 2007/0284328 A1 * | 12/2007 | Mochida et al. | ............. | 213/221 |
| 2007/0296249 A1 * | 12/2007 | Tao et al. | ..................... | 296/191 |
| 2008/0084012 A1 * | 4/2008 | Matlack et al. | ............... | 269/20 |

FOREIGN PATENT DOCUMENTS

JP 2007283376 A * 11/2007

OTHER PUBLICATIONS

Machine translation of JP-2007283376A.*

* cited by examiner

*Primary Examiner*—Kiley Stoner
(74) *Attorney, Agent, or Firm*—Studebaker & Brackett PC; Donald R. Studebaker

(57) ABSTRACT

In a first step, a roof panel and a front header are joined at plural frictional spot joint portions at a front-end frictional joint area, and the roof panel and a rear header are joined at plural frictional spot joint portions at a rear-end frictional joint area. The roof panel and a side roof rail are joined at plural frictional spot joint portions at left-side and right-side frictional joint areas. Subsequently, in a second step, the members are joined at the plural rivet joint portions at a border area of the above-described joint areas, and the members are joined at plural rivet joints at a bounder area of the above-described joint areas. Accordingly, there can be provided a joining method and structure of metal members that can properly reduce deformation due to a thermal strain.

12 Claims, 6 Drawing Sheets

JOINING METHOD AND STRUCTURE OF METAL MEMBERS

BACKGROUND OF THE INVENTION

The present invention relates to a joining method and structure of metal members, in which a first metal member and a second metal member, which have different coefficient of thermal expansion from one another, are overlapped and joined.

A structure using steel plate members and aluminum plates has been widely applied to a vehicle body of an automotive vehicle and so on for the purpose of weight reduction in particular. Herein, a mechanical joining, such as a blind rivet, self-piercing rivet, or clinching, has been used as means for joining the steel plate and the aluminum plate. For example, U.S. Patent Application Publication No. 2005/0140158 A1 discloses a joining structure of vehicle-body members in which a joint portion of an aluminum roof panel and joint portions of side, front, rear roof rails are joined by a self-piercing rivet.

Meanwhile, a frictional spot joining for joining the first and second metal members, which have different coefficient of thermal expansion from one another, with a frictional heat has been practically used recently. In this frictional joining, the overlapped first and second metal members are pressed with a rotating tool of a frictional spot joining apparatus from a side of the first metal member, a frictional heat is generated by contact of the rotating tool with the first metal member, the first metal member is softened with the frictional heat generated and made in a plastic flow state, and the overlapped first and second metal members are spot-joined in a solid state (see U.S. Patent Application Publication No. 2005/0035180 A1, for example).

According to the above-described joining structure of vehicle-body members, many rivet joint portions are formed along the joint portions of the aluminum roof panel and the side, front and rear roof rails. Thus, the number of rivets used is considerably large, so joining costs including material cost may increase.

According to the above-described friction spot joining of the first and second metal members having different coefficient of thermal expansion, deformation due to a thermal strain may occur to the member having higher coefficient of thermal expansion because the joining is conduced while the members are in a thermal-expansion state. In particular, in a case where a light-metal member having higher coefficient of thermal expansion and a steel member are spot-joined, there may occur a considerably large deformation due to the thermal strain to the light-metal member.

SUMMARY OF THE INVENTION

An object of the present invention is to provide a joining method and structure of metal members that can properly reduce the deformation due to the thermal strain, be applied to joining of relatively large-sized metal members, reduce joining costs including material cost.

According to a first aspect of the present invention, there is provided a joining method of metal members, in which a first metal member and a second metal member, which have different coefficient of thermal expansion from one another, are overlapped and joined, the joining method comprising a first step of forming a plurality of first joint portions, the first joint portions being formed by a frictional joining at a frictional joint area of the overlapped first and second metal members, the frictional joining comprising pressing of a rotating tool under rotation against the first metal member for generating a frictional heat, softening of the first metal member with the frictional heat generated for making a plastic flow state at the first metal member, and joining of the overlapped first and second metal members in a solid state, and a second step of forming a second joint portion, the second joint portion being formed by a mechanical joining at a joint area of the overlapped first and second metal members that is located at an end portion of the frictional joint area.

According to the above-described joining method of metal members, the plurality of first joint portions are formed by the frictional joining at the Fictional joint area of the overlapped first and second metal members in the first step. The first joint portions are formed by the pressing of the rotating tool under rotation against the first metal member for generating the frictional heat, the softening of the first metal member with the frictional heat generated for making the plastic flow state at the first metal member, and the joining of the overlapped first and second metal members in the solid state. Then, in the second step, the second joint portion is formed by the mechanical joining, which generates little heat, at the joint area of the overlapped first and second metal members that is located at the end portion of the frictional joint area. Thereby, properly reducing deformation due to the cumulative thermal strain which may occur when the plurality of first joint portions are formed at the frictional joint area in the first step, the second joint portion can be formed by the mechanical joining at the joint area of the overlapped first and second metal members that is located at the end portion of the frictional joint area. Accordingly, the frictional joining (the first joint portions) and the mechanical joining (the second joint portion) can be used properly according to the joining structure of the first and second metal members. Further, since the second joint portion is formed by the mechanical joining, which generates little heat, at the joint area of the overlapped first and second metal members that is located at the end portion of the frictional joint area, the deformation of the first metal member due to the thermal strain caused by the coefficient of thermal expansion difference at the frictional joining can be reduced, thereby improving assembling accuracy and quality The joining strength of the second joint portion can be ensured as well. Also, since the plurality of first joint portions are formed and the second joint portion is formed at the joint area that is located at the end portion of the frictional joint area, the number of the second joint portion by the mechanical joining can be reduced properly, the joining costs including material cost can be reduced.

According to a second aspect of the present invention, there is provided a joining method of metal members, in which a first metal member and a second metal member, which have different coefficient of thermal expansion from one another, are overlapped and joined, the joining method comprising a first step of forming a plurality of first joint portions, the first joint portions being formed by a frictional joining at a plurality of frictional joint areas of the overlapped first and second metal members, the frictional joining comprising pressing of a rotating tool under rotation against the first metal member for generating a fictional heat, softening of the first metal member with the frictional beat generated for making a plastic flow state at the first metal member, and joining of the overlapped first and second metal members in a solid state, and a second step of forming a second joint portion, the second joint portion being formed by a mechanical joining at a joint area of the overlapped first and second metal members that is located between the frictional joint areas.

According to the above-described joining method of metal members, the plurality of first joint portions are formed by the frictional joining at the plurality of frictional joint areas of the overlapped first and second metal members in the first step. The first joint portions are formed by the pressing of the rotating tool under rotation against the first metal member for generating the frictional heat, the softening of the first metal member with the frictional heat generated for making the plastic flow state at the first metal member, and the joining of the overlapped first and second metal members in the solid state. Then, in the second step, the second joint portion is formed by the mechanical joining, which generates little heat, at the joint area of the overlapped first and second metal members that is located between the frictional joint areas. Thereby, properly reducing deformation due to the cumulative thermal strain which may occur when the plurality of first joint portions are formed at the frictional joint area in the first step, the second joint portion can be formed by the mechanical joining at the joint area of the overlapped first and second metal members that is located at the end portion of the frictional joint area. Accordingly, the frictional joining (the first joint portions) and the mechanical joining (the second joint portion) can be used properly according to the joining structure of the first and second metal members. Further, since the second joint portion is formed by the mechanical joining, which generates little heat, at the joint area of the overlapped first and second metal members that is located between the fictional joint areas, the deformation of the first metal member due to the thermal strain caused by the coefficient of thermal expansion difference at the frictional joining can be reduced, thereby improving assembling accuracy and quality. The joining strength of the second joint portion can be ensured as well. Also, since the plurality of first joint portions are formed and the second joint portion is formed at the joint area that is located between the frictional joint areas, the number of the second joint portion by the mechanical joining can be reduced properly, the joining costs including material cost can be reduced.

According to an embodiment of the present invention, the first metal member is a light-metal member, and the second metal member is a steel member. Thereby, the deformation of the light-metal member due to the thermal strain caused by the coefficient of thermal expansion difference at the frictional joining can be reduced.

According to another embodiment of the present invention, the first metal member is a roof panel of a vehicle, and the second metal member includes a roof rail of the vehicle. Thereby, even in a case where the large-sized metal member, such as the roof rail of the vehicle, is joined, the deformation of the roof panel due to the thermal strain caused by the coefficient of thermal expansion difference at the frictional joining can be reduced. Further, a light-metal roof panel can be applied, thereby achieving a weight reduction of the vehicle.

According to another embodiment of the present invention, the mechanical joining is a rivet joining. Thereby, the joining strength of the joint area that is located at the end portion of the frictional joint area or between the frictional joint areas can be surely increased.

According to a third aspect of the present invention, there is provided a joining structure of metal members, in which a first metal member and a second metal member, which have different coefficient of thermal expansion from one another, are overlapped and joined, the joining structure comprising a plurality of first joint portions, the first joint portions being formed by a frictional joining at a frictional joint area of the overlapped first and second metal members, the fictional joining comprising pressing of a rotating tool under rotation against the first metal member for generating a frictional heat, softening of the first metal member with the frictional heat generated for making a plastic flow state at the first metal member, and joining of the overlapped first and second metal members in a solid state, and a second joint portion, the second joint portion being formed by a mechanical joining at a joint area of the overlapped first and second metal members that is located at an end portion of the frictional joint area. This joining structure of metal members performs substantially the same functions as the above-described first aspect of the present invention does.

According to a fourth aspect of the present invention, there is provided a joining structure of metal members, in which a first metal member and a second metal member, which have different coefficient of thermal expansion from one another, are overlapped and joined, the joining structure comprising a plurality of first joint portions, the first joint portions being formed by a frictional joining at a plurality of frictional joint areas of the overlapped first and second metal members, the frictional joining comprising pressing of a rotating tool under rotation against the first metal member for generating a frictional heat, softening of the first metal member with the frictional heat generated for making a plastic flow state at the first metal member, and joining of the overlapped first and second metal members in a solid state, and a second joint portion, the second joint portion being formed by a mechanical joining at a joint area of the overlapped first and second metal members that is located between the frictional joint areas. This joining structure of metal members performs substantially the same functions as the above-described second aspect of the present invention does.

According to another embodiment of the present invention, the first metal member is a roof panel of a vehicle, the second metal member includes a roof rail and a reinforcement plate member of the vehicle, the first joint portions are formed at a joint portion of the roof panel and the roof rail, and the second joint portion is formed at a joint portion of the roof panel, the roof rail and the reinforcement plate member. Thereby, the deformation of the roof panel can be reduced, and the joining strength of the roof panel, the roof rail and the reinforcement member can be increased. Further, the light-metal roof panel can be applied, thereby achieving the weight reduction of the vehicle.

According to another embodiment of the present invention, the second joint portion is a rivet joint portion. Thereby, the joining strength of the second joint portion can be surely increased.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings. The following contains descriptions of a joining method and a joining structure of metal members.

Figure 1:
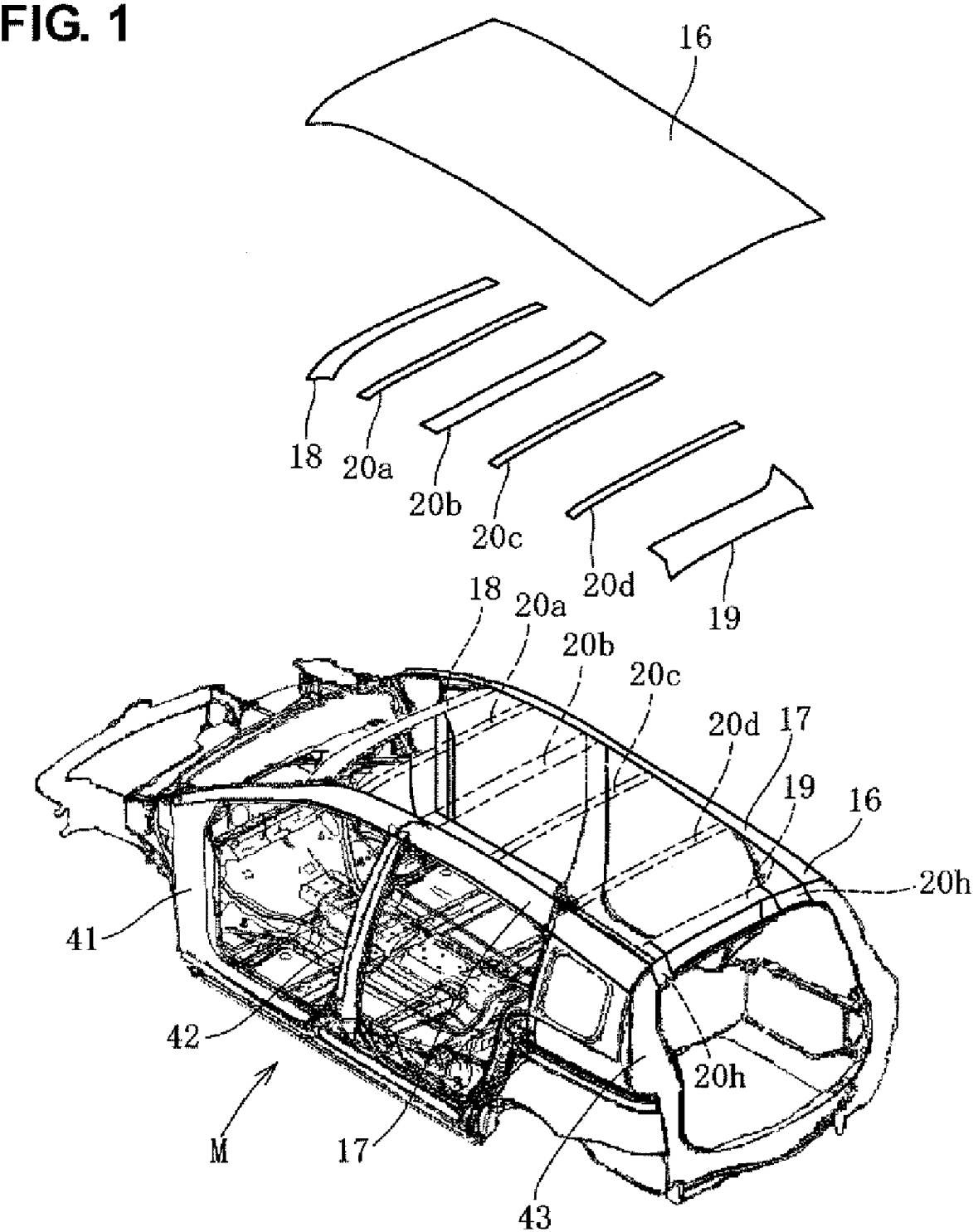
FIG. 1 is an exploded perspective view of a vehicle body structure, a roof panel, and reinforcement plate members according to an embodiment of the present invention.
Figure 2:
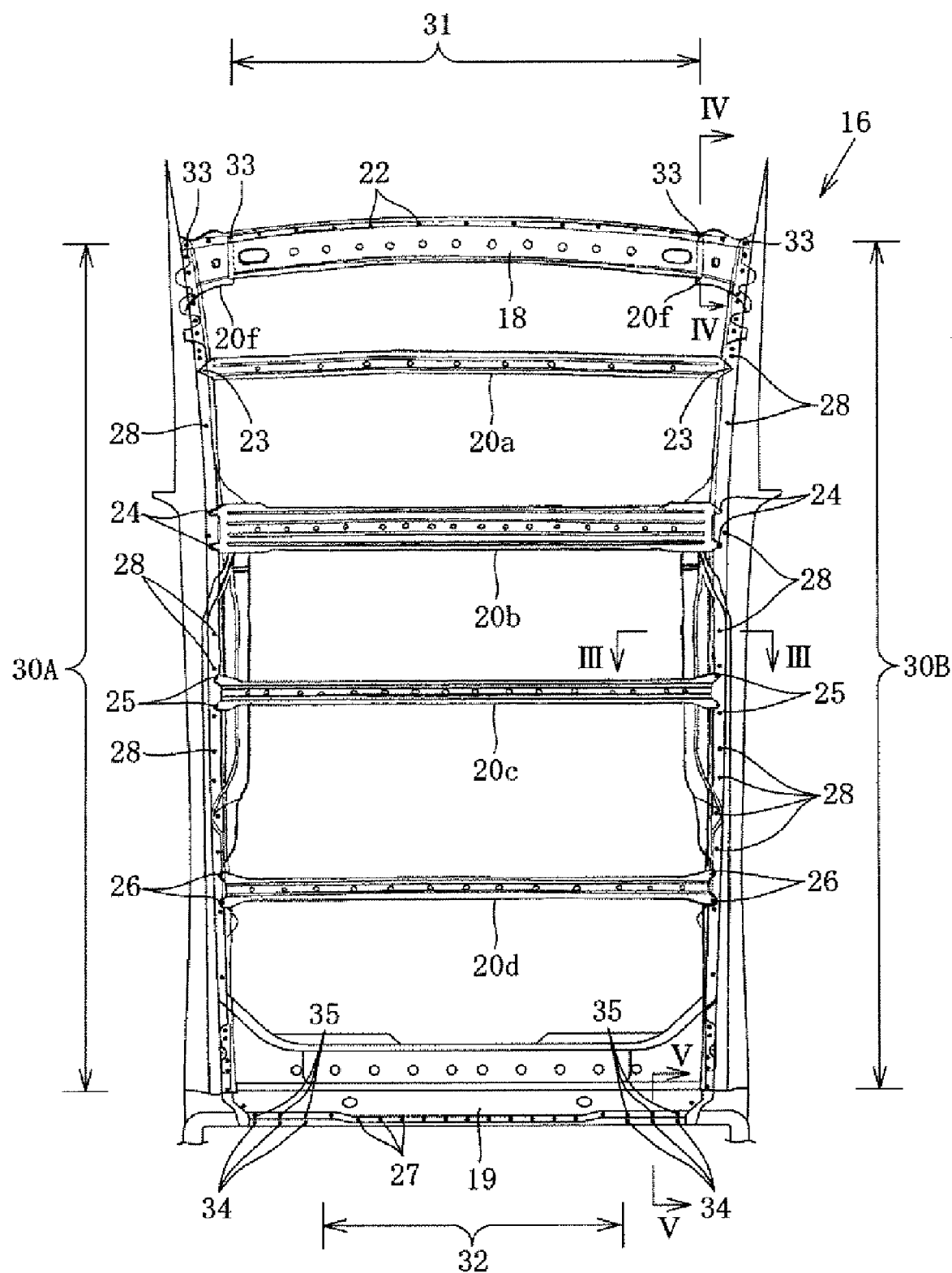
FIG. 2 is a plan view of a major part of the vehicle body structure that is shown without the roof panel.

As shown in FIGS. 1 and 2, a vehicle body structure M of an automotive vehicle comprises a pair of front pillars 41, a pair of center pillars 42, a pair of rear pillars 43, a front header 18 that interconnects upper end portions of the pair of front pillars 41, a rear header 19 that interconnects upper end portions of the pair of rear pillars 43, a pair of side roof rails 17 that are provided so as to extend from upper ends of the front pillars 41 to upper ends of the rear pillars 43 by way of upper ends of the center pillars 42, and a roof panel 16 of a roof structure. Herein, these members except the roof panel 16 are made of a steel plate. FIG. 2 is a plan view of a major part of the vehicle body structure M that is shown without the roof panel 16.

The roof structure, which is disposed at an upper end of the vehicle body structure M, comprises the roof panel 16 that is made of an aluminum plate and a plurality of reinforcement plate members 20a-20d that are made of a steel plate, respectively. These reinforcement plate members 20a-20d are joined to a bottom face of the roof panel 16 by a frictional spot joining, which will be described below. The plural reinforcement plate members 20a-20d and the front and rear headers 18, 19 are previously joined to the roof panel 16 by the frictional spot joining in a sub-assembling step.

Namely, as shown in FIG. 2, both end portions of the reinforcement plate member 20a are joined to the roof panel 16 at plural frictional spot joint portions 23. Likewise, both end portions of the reinforcement plate member 20b are joined to the roof panel 16 at plural frictional spot joint portions 24. Both end portions of the reinforcement plate member 20c are joined to the roof panel 16 at plural frictional spot joint portions 25. Both end portions of the reinforcement plate member 20d are joined to the roof panel 16 at plural frictional spot joint portions 26. The front header 18 is joined to the roof panel 16 at plural frictional spot joint portions 22, and the rear header 19 is joined to the roof panel 16 at plural frictional spot joint portions 27.

Figure 6:
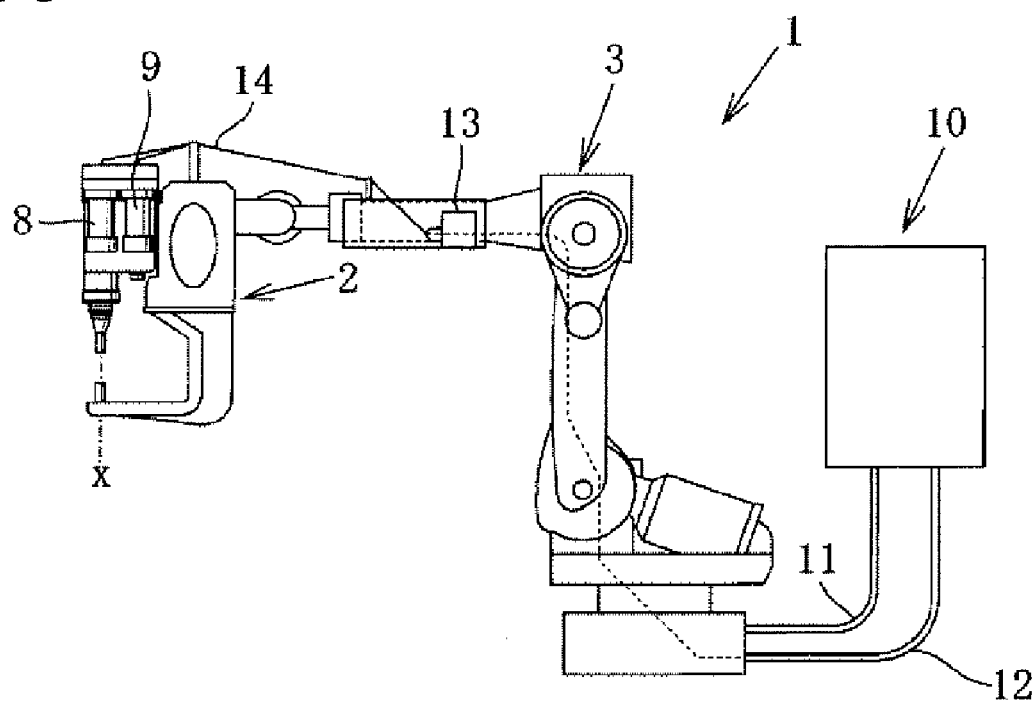
FIG. 6 is a side view of a frictional spot joining apparatus.

Hereinafter, a frictional spot joining apparatus 1 to conduct the fictional spot joining will be described. The frictional spot joining apparatus 1, as shown in FIGS. 6 and 7, comprises a robot 3 that is equipped with a joining gun 2, a control device 10 that drives and controls the robot 3 and the joining gun 2, a work holding device (not illustrated) that holds two (or three) overlapped metal members to be spot-joined by the joining gun 2.

The robot 3 is a six-axis multiple-articulated type of robot, which has been used widely, and equipped with the joining gun 2 at a tip of its robot hand. The robot 3 moves the joining gun 2 between a spot joining position for joining the metal members held by the work holding device and a standby position that is retreated from the spot joining position.

Figure 7:
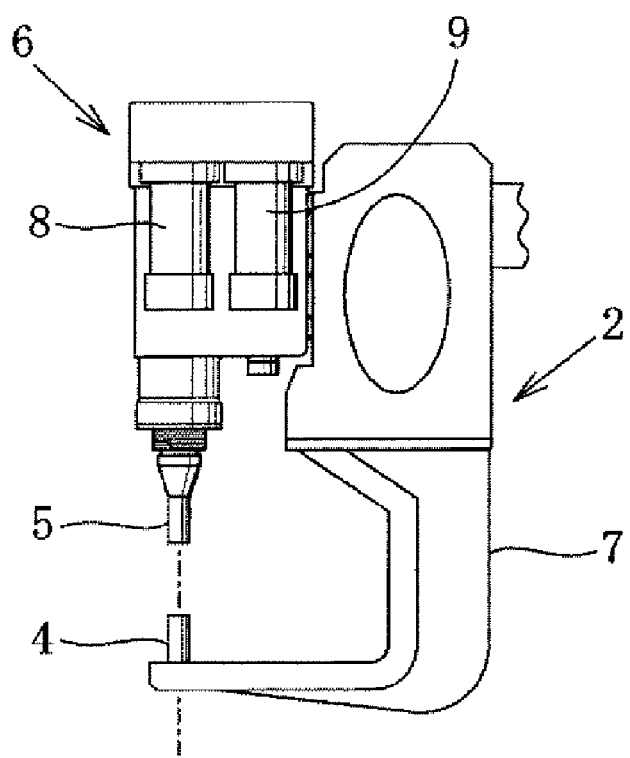
FIG. 7 is an enlarged sectional view of a major part of surrounding of a joining gun of the frictional spot joining apparatus.

The joining gun 2, as shown in FIG. 7, comprises an anvil 4, a rotating tool 5, and a rotating-tool drive mechanism 6. The anvil 4 and the rotating tool 5 are disposed vertically so as to face each other. The anvil 4 is detachably attached to a lower end portion of a L-shaped arm 7. The rotating-tool drive mechanism 6 is provided at an upper portion of the arm 7, and the rotating tool 5 is detachably attached to the rotating-tool drive mechanism 6 so as to face downward. The rotating-tool drive device 6 includes a rotational motor 8 that rotates the rotating tool 5 around a joining axis X and an up-down motor 9 that moves up and down the rotating tool 5 along the joining axis X to press the plural metal members.

Figure 8:
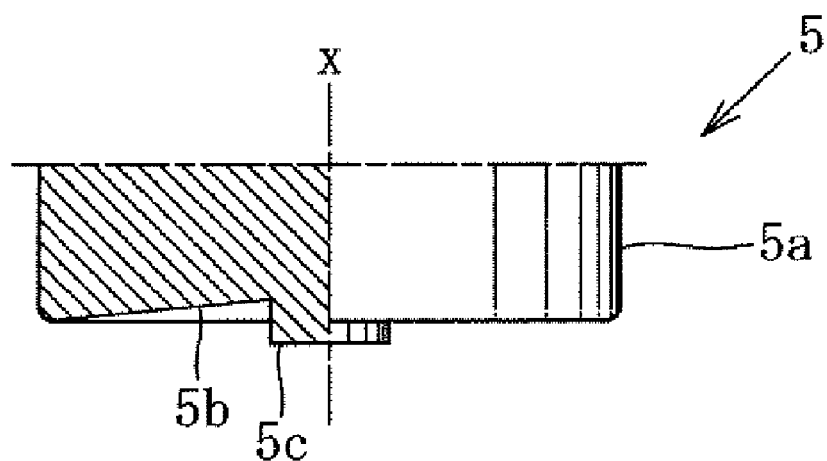
FIG. 8 is a partial sectional view of a major part of a rotating tool.

As shown in FIG. 8, a shoulder portion 5b is formed at a tip face (lower-end face) of a body portion 5a of the rotating tool 5. The shoulder portion 5b is not flat, but of a concave shape with its center line that is coaxial with the joining axis X. At a center portion of the shoulder portion 5b is provided a pin portion 5c so as to project. The anvil 4 has substantially the same size of diameter as that of the rotating tool 5, and a tip face of the anvil 4 is formed in a flat shape.

The control device 10 is coupled to various electromotive actuators (not illustrated) of the robot 3 via a harness 11 so as to drive and control the actuators, as shown in FIG. 6. Further, the control device 10 is coupled to the rotational motor 8 and the up-down motor 9 of the joining gun 2 via a harness 12, a junction box 13, and a harness 14 so as to drive and control these motors 8, 9.

Figure 9:
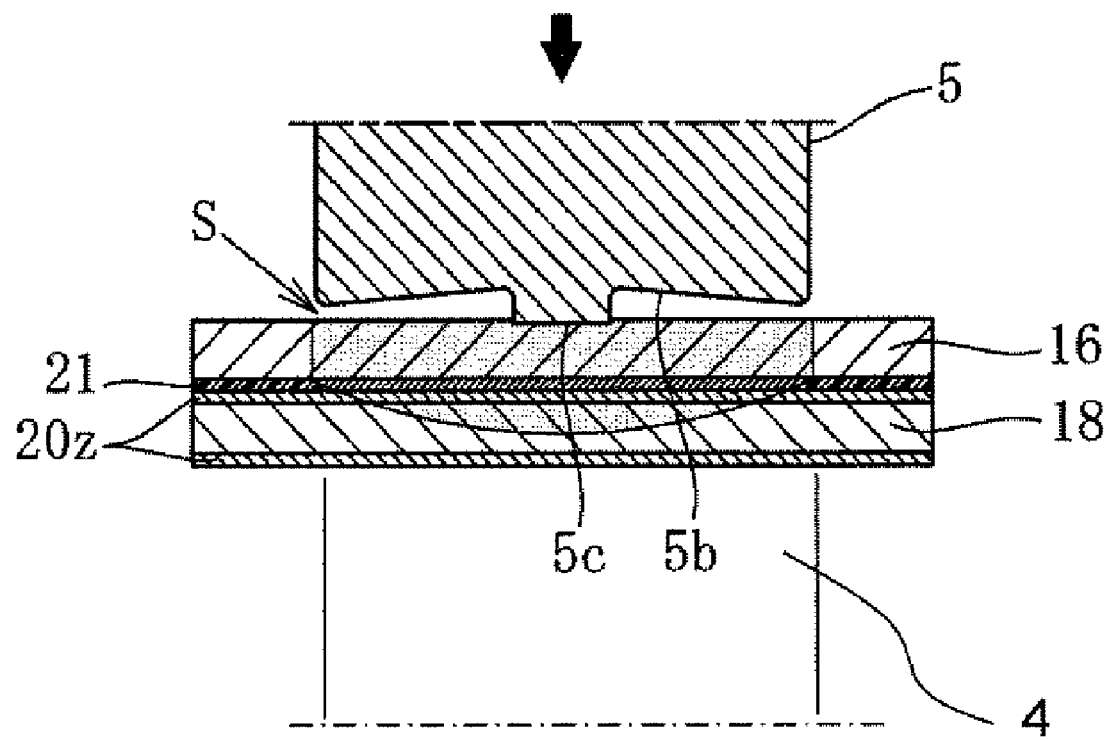
FIG. 9 is an enlarged sectional view of a frictional joint portion to be formed by the frictional spot joining with the rotating tool.
Figure 10:
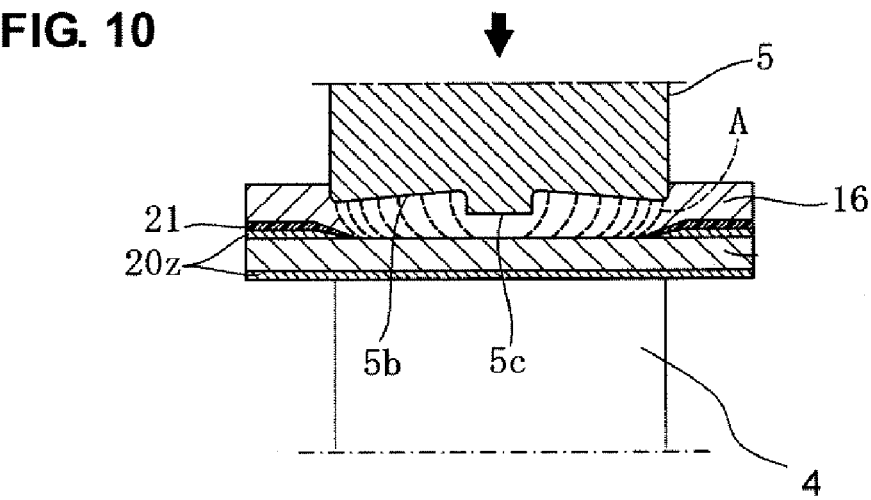
FIG. 10 is an enlarged sectional view of the frictional joint portion formed by the frictional spot joining with the rotating tool.

The above-described sub-assembling step will be described by referring to an example in which the front header 18 is joined to the roof panel 16 by the frictional spot joining with the frictional spot joining apparatus 1. As shown in FIGS. 9 and 10, before overlapping the roof panel 16 over the front header 18 for setting at the apparatus 1, a layer 21 of an insulating adhesive for galvanic corrosion prevention is formed on each contact face of these members 16, 18.

Herein, a chemical reaction type of adhesive, such as epoxy-based, urethane-based, acryl-based adhesive, may be used as the above-described adhesive. Next, the robot 3 is driven to move the joining gun 2 to a position where the joint portion of the overlapped roof panel 16 and the front header 18 is just located between the anvil 4 and the rotating too 5. Thereby, the joint portion is set on the anvil 4, and rotating tool 5 is set above the joint portion.

The rotating tool 5 under rotation is lowered by the up-down motor 9 of the rotating-tool drive mechanism 6 so as to press against the roof panel 16. This contact of the rotating tool 5 with the roof panel 16 generates a frictional heat. The roof panel 16 is softened with the frictional heat generated for making a plastic flow state at the roof panel 16. Then, the roof panel 16 and the front header 18 are joined by the frictional spot joining in a solid state at a specified temperature below its melting point (i.e., a frictional spot joining under a solid state without melting).

This frictional spot joining will be described more specifically. As shown in FIGS. 9 and 10, as the rotating tool 5 under rotation is lowered, the pin portion 5c of the rotating tool 5 first contacts the roof panel 16 and conducts positioning of the tool 5 on the panel 16. Subsequently, the shoulder portion 5b contacts the panel 16. Herein, the joint portion of the roof panel 16 comes to be softened with the frictional heat generated. According to the further lowering of the rotating tool 5 and its proceeding into the softened roof panel 16, the joint portion of the roof panel 16 at a point where a contact pressure has increased highly is sheared. Herein, the above-described adhesive layer 21 and a zinc plating layer 20z, which has been formed on the surface of the front header 18 as well, are softened with the frictional heat, and these layers 21, 20z are diffused into the above-described sheared portion.

Next, as the rotating tool 5 is further pressed, a plastic flow portion A (plastic deformation portion) occurs at the joint portion of the roof panel 16 and the sheared portion expands outward. At the same time, the adhesive layer 21 and the zinc plating layer 20z, which remain at the boundary face between the roof panel 16 and the front header 18, is pushed outwardly. Herein, an oxidation film that has been formed on the surface of the roof panel may be destroyed by the shearing deformation of the roof panel 16, so that a fresh surface without the oxidation film is generated on the roof panel 16. Meanwhile, the plastic flow begins from its most outer peripheral portion at the plastic flow portion A.

Part of the softened and melt zinc plating layer 20z on the surface of the front header 18 may be taken into the roof panel 16, and the rest of the zinc plating layer 20z may be pushed outside the joint portion by the pressing force of the rotating tool 5. Accordingly, in a area where the zinc plating layer 20z has disappeared, both the fresh surfaces of the roof panel 16 and the front header 18, where the oxidation film has been destroyed, directly contact each other and they are joined. Thus, the front header 18 is joined to the bottom face of the front portion of the roof panel 16 at the plural frictional spot joint portions 22 (see FIG. 2). Herein, the above-described zinc plating layer 20z is a layer to be formed on the surface of the steel front header 18, which prevents a surface oxidation normally and, when the joining is conducted, achieves the solid-state joining of the fresh surfaces of the roof panel 16 and the front header 18 by being softened and melt with the frictional heat and pushed out by the pressing force of the rotating tool 5. Herein, instead of the zinc plating layer 20z, another metal plating layer having a relatively low melting point, such as a zinc-alloy plating layer, may be used as long as it can prevent the surface oxidation of a steel plate normally and, when the joining is conducted, be softened and melt with the frictional heat and pushed out by the pressing force of the rotating tool 5.

The rear header 19 is likewise joined to the roof panel 16 at the plural friction spot joint portions 27 with the frictional spot joining apparatus 1 in the sub-assembling step. Also, the reinforcement plate member 20a are joined to the roof panel 16 at the frictional spot joint portions 23. The reinforcement plate member 20b are joined to the roof panel 16 at the plural frictional spot joint portions 24. The reinforcement plate member 20c are joined to the roof panel 16 at the plural frictional spot joint portions 25. The reinforcement plate member 20d is joined to the roof panel 16 at the plural frictional spot joint portions 26.

As described above, in the sub-assembling step, as shown in FIGS. 1 and 2, the plural reinforcement plate members 20a-20d are joined to the roof panel 16 by the frictional spot joining, and a front-end frictional joint area 31 where a front end joint portion 16f of the roof panel 16 is joined to the front header 18 at the plural frictional spot joint portions 22 is formed, while a rear-end frictional joint area 32 where a rear end joint portion 16r of the roof panel 16 is joined to the rear header 19 at the plural frictional spot joint portions 27 is formed. The frictional spot joining step where the respective headers 18, 19 are joined to the roof panel 16 corresponds to the first step of the present invention. Herein, it is preferable that the plural sport joining of the headers 18, 19 to the roof panel 16 be conducted from the center to the side-end portions in order in a vehicle width direction in order to restrain the deformation due to the thermal strain that may be caused by the coefficient of thermal expansion of the roof panel 16.

As described above, as shown in FIGS. 1 and 2, the sub-assembled roof panel 16 is assembled to the upper end portion of the vehicle body structure M, and then the both side rails 17 are Joined to the roof panel 16 by the fictional spot joining with the frictional spot joining apparatus 1. This step also corresponds to the first step of the present invention.

Namely, there are provided the left-side and right-side frictional joint areas 30A, 30B where the both-end joint portions 16a of the roof panel 16 are joined to the both side roof rails 17 at the plural frictional spot joint portions 28. Herein, it is preferable that the plural sport joining of the roof panel 16 to the side roof rails 17 be conducted from the center to the end portions in a vehicle longitudinal direction in order to restrain the deformation due to the thermal strain that may be caused by the coefficient of thermal expansion of the roof panel 16.

Figure 3:
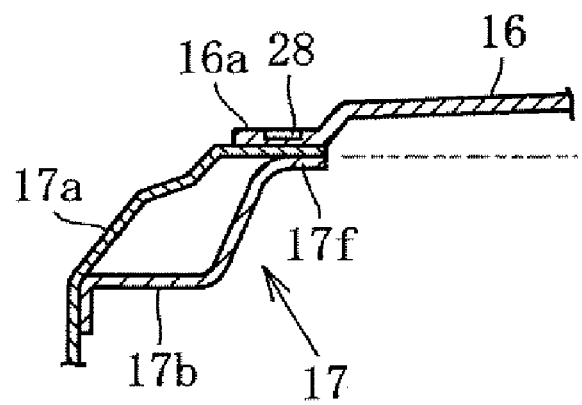
FIG. 3 is a sectional view taken along line III-III of FIG. 2.
Figure 11:
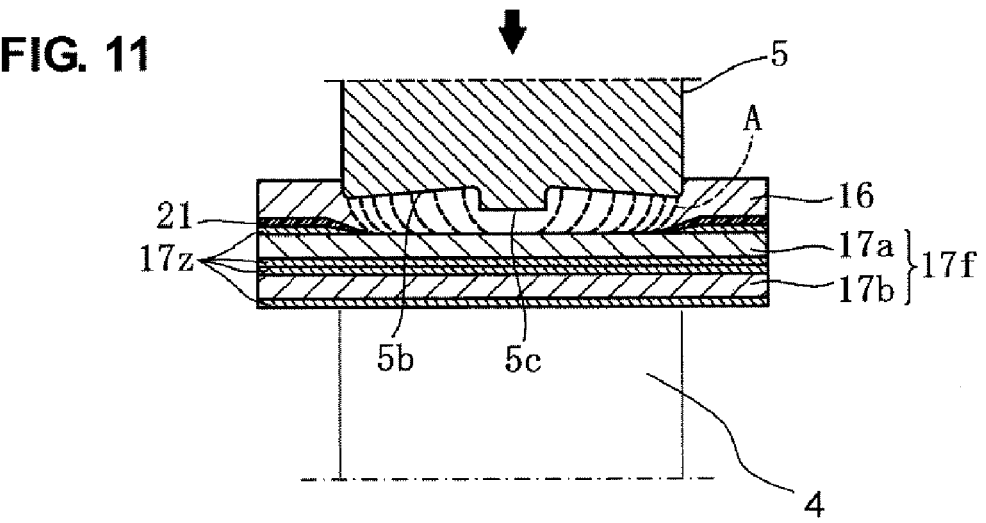
FIG. 11 is an enlarged sectional view of the frictional joint portion formed by the frictional spot joining with the rotating tool which is applied to three plate members.

The joint structure of the roof panel 16 to the side roof rail 17 at the right-side frictional joint area 30B will be described referring to FIGS. 3 and 11. On a right side of the vehicle body structure is formed the side roof rail 17 with a cab-side outer 17a and a cab-side inner 17b so as to have a closed cross section. At an upper end portion of the side roof rail 17 is previously formed a joint portion 17f that is made of respective flanges of the cab-side outer 17a and the cab-side inner 17b that are joined by a resistance spot joining. After, the adhesive layer 21 is formed on an upper face of the joint portion 17f, the joint portion 16a of the right-end of the roof panel 16 is overlapped on the upper face of the joint portion 17f, and then the joint portion 16a and the joint portion 17f are joined at the plural frictional spot joint portions 28. The joining of the roof panel 16 and the side roof rail 17 on the left-side frictional joint area 30A is conducted likewise.

In the second step following the first step described above, as shown in FIGS. 2 and 4, the front-end portion 16f of the roof panel 16 is joined to the front header 18 and a reinforcement plate member 20f of the front pillar 41 at plural rivet joint portions 33 by a mechanical joining at a joint area that is located between the front-end frictional joint area 31 and the left-side frictional joint area 30A and at another joint area that is located between the front-end frictional joint area 31 and the right-side frictional joint area 30B. And, the rear-end portion 16r of the roof panel 16 is joined to the rear header 19, a hinge-reinforcement plate member 20g of a back door, and a corner reinforcement member 20h at plural rivet joint portions 34, 35 by the mechanical joining at a joint area that is located between the rear-end frictional joint area 32 and the left-side frictional joint area 30A and at another joint area that is located between the rear-end frictional joint area 32 and the right-side frictional joint area 30B.

Figure 12:
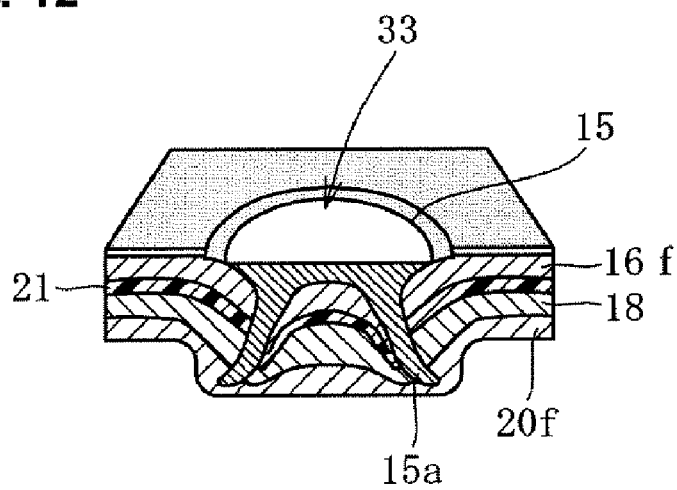
FIG. 12 is an enlarged sectional view of a rivet joint portion.

A rivet joining apparatus (not illustrated) for forming the rivet joint portions 33-35 is an apparatus for performing the rivet joining using a conventional self-piercing rivet 15 (see FIG. 12).

Figure 4:
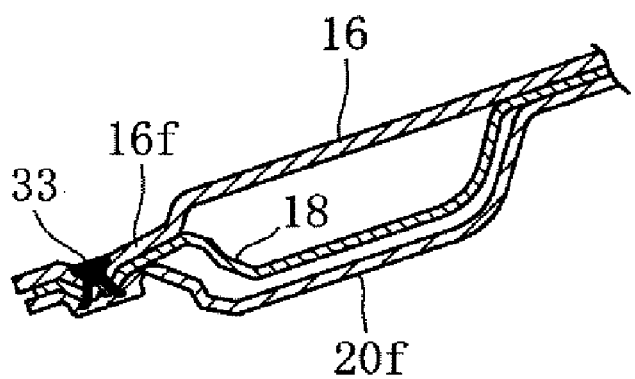
FIG. 4 is a sectional view taken along line IV-IV of FIG. 2.

The structure of the rivet joint portion 33 on the front side will be described. As shown in FIGS. 4 and 12, the adhesive layer 21 is formed on the upper surface of the joint portion of the front header 18, the joint portion 16f of the roof panel 16 is overlapped on that, and the rivet joining is conducted by the rivet joining apparatus with the self-piercing rivet 15 in a state where the joint portion for the reinforcement plate member 20f is placed on the lower face of the joint portion of the front header 18.

Thus, three plate members of the joint portion 16f of the aluminum roof panel 16, the joint portion of the steel front header 18, and the joint portion of the reinforcement plate member 20f are joined at the rivet joint portion 33 (mechanical joining). A leg portion 15a of the rivet 15 extends through the joint portion 16f of the roof panel 16 and the joint portion of the font header 18 at the rivet joint portion 33, but it does not extend through the joint portion of the reinforcement plate member 20f. Thereby, the leg portion 15a of the rivet 15 expands its diameter in a taper shape in the reinforcement plate member 20f, thereby forming a calking state.

Figure 5:
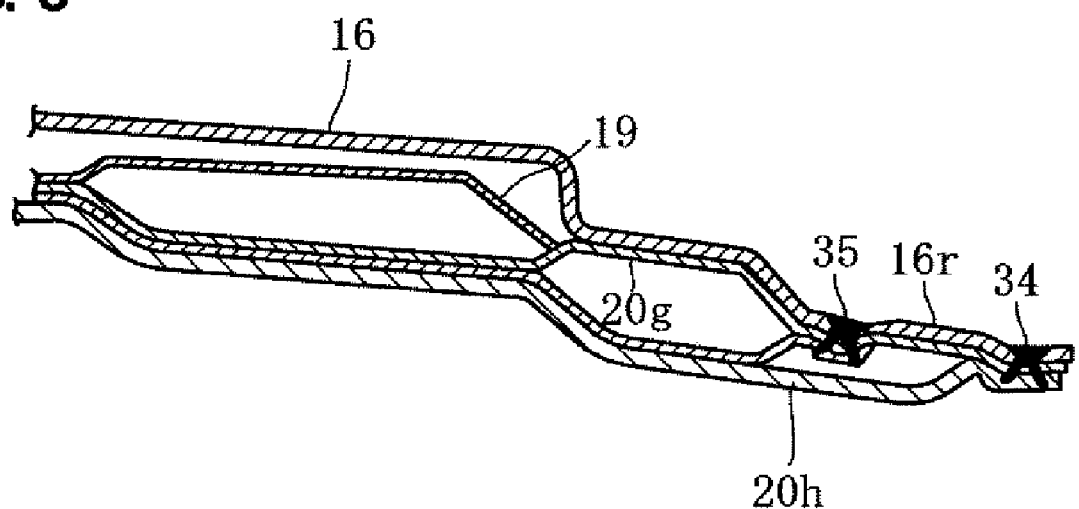
FIG. 5 is a sectional view taken along line V-V of FIG. 2.

Next, the structure of the rivet joint portions 34, 35 on the rear side will be described, which is substantially the same as that of the above-described rivet joint portion 33. As shown in FIG. 5, the joint portion 16r near a corner of the rear end portion of the roof panel 16, the joint portion of the both ends of the rear header 19, and the joint portion of the corner reinforcement member 20h are joined at the plural rivet joint portions 34 by the self-piercing rivet 15. The joint portion 16r of the roof panel 16 and the hinge reinforcement plate member 20g are joined at the plural rivet joint portions 35 by the self-piercing rivet 15.

In the above-described embodiment, the front header 18 corresponds to the front roof rail, and the rear header 19 corresponds to the rear roof rail. Further, the roof panel 16 corresponds to the "first metal member" as the "light-metal" member The front header 18, rear header 19, side roof rail 17, reinforcement plate members 20a-20d, 20f-20h correspond to the "second metal member." The frictional spot joint portions 22, 27, 28 correspond to the "first joint portion" and the rivet joint portions 33-35 correspond to the "second joint portion."

Hereinafter, operations and effects of the above-described joining method and structure of metal members will be described. In the first step, the front-end joint portion 16f of the roof panel 16 and the joint portion of the front header 18 are joined in the solid state at the plural frictional spot joint portions 22 at the front-end frictional joint area 31, and the rear-end joint portion 16r of the roof panel 16 and the joint portion of the rear header 19 are joined in the solid state at the plural frictional spot joint portions 27 at the rear-end frictional joint area 32. Further, the both-end joint portions 16a of the aluminum roof panel 16 and the joint portion 17f of the side roof rail 17 are joined in the solid state at the plural frictional spot joint portions 28 at the left-side and right-side frictional joint areas 30A, 30B.

In the second step following the first step described above, the joint portion 16f of the roof panel 16 is joined to the front header 18 along with the reinforcement plate member 20f at the plural rivet joint portions 33 by the mechanical joining at the joint area that is located between the front-end frictional joint area 31 and the left-side frictional joint area 30A and at another joint area that is located between the front-end frictional joint area 31 and the right-side frictional joint area 30B. And, the joint portion 16r of the roof panel 16 is joined to the rear header 19 along with the hinge-reinforcement plate members 20g, 20h at the plural rivet joint portions 34, 35 by the mechanical joining at the joint area that is located between the rear-end frictional joint area 32 and the left-side frictional joint area 30A and at another joint area that is located between the rear-end frictional joint area 32 and the right-side frictional joint area 30B.

Thereby, it can be reduced that the deformation due to the thermal strain caused by the coefficient of thermal expansion difference between the aluminum member and the steel member is accumulated from the left-side or right-side frictional joint areas 30A, 30B to the front-end frictional joint area 31 or from the front-end frictional joint area 31 to the left-side or right-side frictional joint areas 30A, 30B. The respective corner portions of the font portion of the roof panel 16 can be surely joined at the plural rivet joint portions 33 with little heat generated.

Likewise, it can be reduced that the deformation due to the thermal strain caused by the coefficient of thermal expansion difference between the aluminum member and the steel member is accumulated from the left-side or right-side frictional joint areas 30A, 30B to the rear-end frictional joint area 32 or from the rear-end frictional joint area 32 to the left-side or right-side frictional joint areas 30A, 30B. The respective corner portions of the rear portion of the roof panel 16 can be surely joined at the plural rivet joint portions 34, 35 with little heat generated. Accordingly, the assembling accuracy and quality of the roof structure can be improved. The joining strength of the second joint portion can be ensured as well.

Further, the frictional spot joining and the rivet joining as the mechanical joining can be used properly according to plate structures of the Joint portions where the roof panel 16 is joined to the vehicle body structure. Also, since most of the joint portions are comprised of the frictional spot joining and extremely small part of the joint portions are comprised of the rivet joining, increase of the joining costs by a material cost of rivets can be suppressed.

Hereinafter, modifications of the above-described embodiment will be described.

1) While the reinforcement plate members 20a-20d are joined to the roof panel 16 by the frictional spot joining in the above-described embodiment, the roof panel 16, the reinforcement plate members 20a-20d, and the side roof panel 17 may be joined by the mechanical joining.

2) While the plural reinforcement plate members 20a-20d and the front or rear headers 18, 19 are joined to the roof panel 16 by the frictional spot joining in the sub-assembling step in the above-described embodiment, at first the plural reinforcement plate members 20a-20d and the front or rear headers 18, 19 may be joined by the resistance spot joining to the side roof rail 17 and the reinforcement plate members 20f, 20g, 20h, then the frictional spot joining of the roof panel 16 and the front or rear headers 18, 19 and the fictional spot joining of the roof panel 16 and the side roof rail 17 may be conducted, and finally the respective corners of the roof panel 16 may be joined at the plural rivet joint portions 33, 34, 35 (mechanical joining).

3) While the above-described embodiment exemplifies a case where the aluminum roof panel 16 is joined to the vehicle body structure, an aluminum-alloy roof panel 16 also may be applied. Further, an aluminum member or a magnesium-alloy member other than the roof panel 16 may be joined to a steel member.

4) While the above-described embodiment exemplifies the rivet joint portions 33-35 with the self-piercing rivet 15, other mechanical joining using a blind rivet, a mechanical clinch, or the like may be applied.

5) Any other modifications and improvements may be applied within the scope of a spirit of the present invention.

What is claimed is:

1. A joining structure of metal members, in which a first metal member and a second metal member, which have different coefficient of thermal expansion from one another, are overlapped and joined, the joining structure comprising:

a plurality of first joint portions, the first joint portions being formed by a frictional joining at a frictional joint area of the overlapped first and second metal members, the frictional joining comprising pressing of a rotating tool under rotation against the first metal member for generating a frictional heat, softening of the first metal member with the frictional heat generated for making a plastic flow state at the first metal member, and joining of the overlapped first and second metal members in a solid state; and a second joint portion, the second joint portion being formed by a mechanical joining at a joint area of the overlapped first and second metal members that is located at an end portion of said frictional joint area.

2. A joining structure of metal members, in which a first metal member and a second metal member, which have different coefficient of thermal expansion from one another, are overlapped and joined, the joining structure comprising:

a plurality of first joint portions, the first joint portions being formed by a frictional joining at a plurality of frictional joint areas of the overlapped first and second metal members, the frictional joining comprising pressing of a rotating tool under rotation against the first metal member for generating a frictional heat, softening of the first metal member with the frictional heat generated for making a plastic flow state at the first metal member, and joining of the overlapped first and second metal members in a solid state; and a second joint portion, the second joint portion being formed by a mechanical joining at a joint area of the overlapped first and second metal members that is located between said frictional joint areas.

3. The joining structure of metal members of claim 1, wherein said first metal member is a light-metal member, and said second metal member is a steel member.

4. The joining structure of metal members of claim 2, wherein said first metal member is a light-metal member, and said second metal member is a steel member.

5. The joining structure of metal members of claim 3, wherein said first metal member is a roof panel of a vehicle, said second metal member includes a roof rail and a reinforcement plate member of the vehicle, said first joint portions are formed at a joint portion of the roof panel and the roof rail, and said second joint portion is formed at a joint portion of the roof panel, the roof rail and the reinforcement plate member.

6. The joining structure of metal members of claim 4, wherein said first metal member is a roof panel of a vehicle, said second metal member includes a roof rail and a reinforcement plate member of the vehicle, said first joint portions are formed at a joint portion of the roof panel and the roof rail, and said second joint portion is formed at a joint portion of the roof panel, the roof rail and the reinforcement plate member.

7. The joining structure of metal members of claim 1, wherein said second joint portion is a rivet joint portion.

8. The joining structure of metal members of claim 2, wherein said second joint portion is a rivet joint portion.

9. The joining structure of metal members of claim 3, wherein said second joint portion is a rivet joint portion.

10. The joining structure of metal members of claim 4, wherein said second joint portion is a rivet joint portion.

11. The joining structure of metal members of claim 5, wherein said second joint portion is a rivet joint portion.

12. The joining structure of metal members of claim 6, wherein said second joint portion is a rivet joint portion.

* * * * *